Dec. 10, 1940.  W. E. GADD  2,224,782
BOLT TENSION MEASURING INSTRUMENT
Filed July 12, 1939
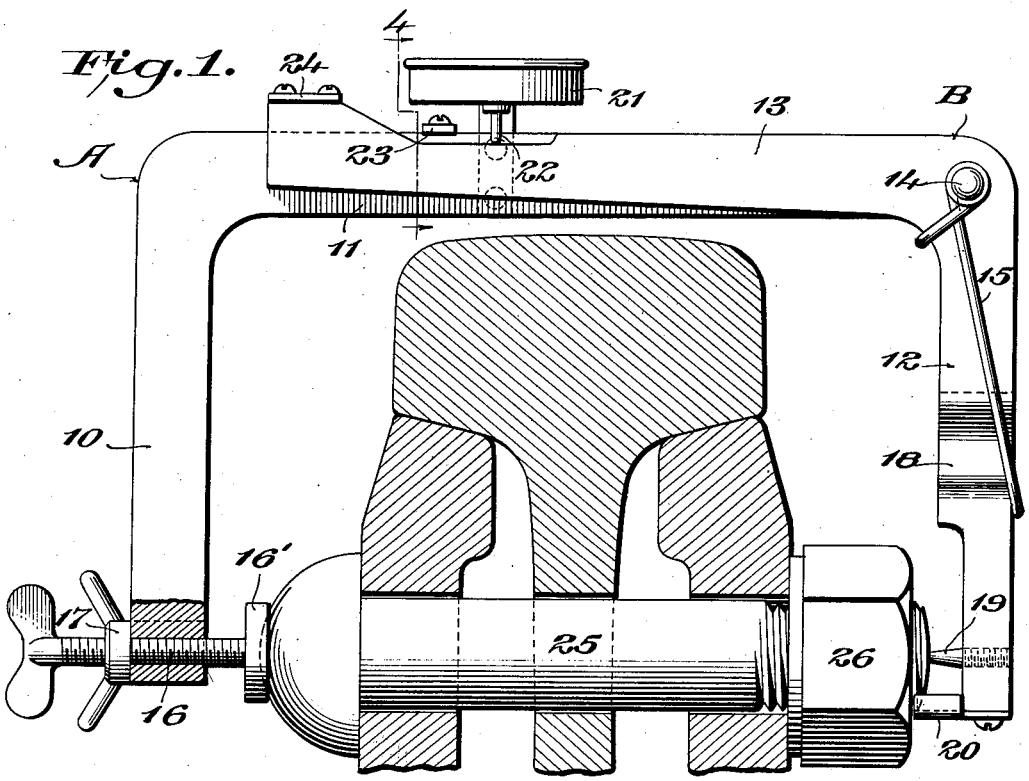
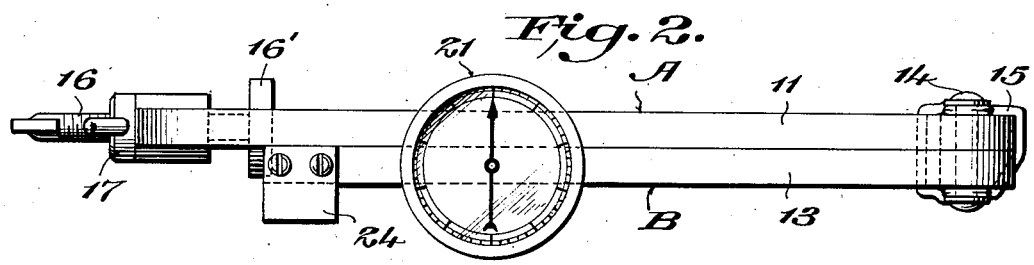
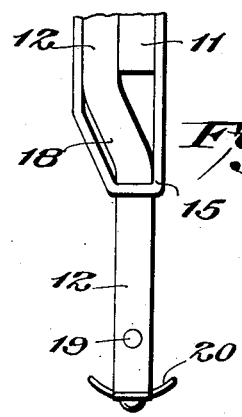
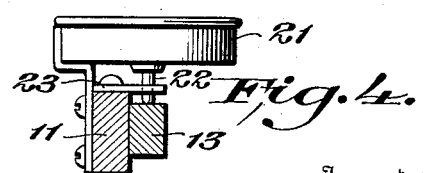
Inventor
W. E. Gadd,
By D. P. Wolhaupter
Attorney Patented Dec. 10, 1940

2,224,782

UNITED STATES PATENT OFFICE 2,224,782

BOLT TENSION MEASURING INSTRUMENT

William Eyre Gadd, East Orange, N. J., assignor to Poor & Company, New York, N. Y., a corporation of Delaware Application July 12, 1939, Serial No. 284,118

2 Claims. (Cl. 33—148)

This invention relates to measuring instruments, and has particular reference to a measuring instrument especially designed to measure the elongation of bolts when placed in tension by associated nuts.

In many instances it is desirable to have a given bolt exert a certain holding force, while in many other instances, where a plurality of bolts are employed as fasteners, it is important to have the different bolts exert as nearly as possible equal holding forces. For example, in the rail joint art it is important not only that the joint bolts should exert a certain definite holding force, but that the several bolts of each joint should exert, as nearly as possible, equal holding forces, in order to obtain maximum efficiency from the joint.

Heretofore it has been common practice to apply a given torque to a nut in order to obtain desired tension in an associated bolt, and to apply equal torques to the nuts of a plurality of bolts in order to obtain equal tension in the bolts. However, due to the many manufacturing inequalities in bolts and nuts and to other causes, the torque applied to a nut is not a good gauge of the tension set up in a bolt and, therefore, is not a good gauge of the holding force exerted by the bolt.

It has been determined that a bolt of any given dimensions will stretch or elongate under load a definite amount within very narrow limits for each different tension to which it is subjected. Therefore, if the elongation of any given bolt under load is known, it is a simple matter to compute, quite accurately, the holding force exerted by the bolt. It follows, therefore, that by tightening the nuts of the bolts until the bolts have become stretched or elongated certain definite amounts, certain definite tensions in the bolts corresponding to certain definite holding forces exerted by the bolts, may be obtained.

Accordingly, the general object of the present invention is to provide a simple, practical, rugged, easily operable, reliable instrument for measuring the elongation of bolts under load, thereby to enable tightening of the bolts to obtain any desired holding force thereof within very narrow limits.

Another object of the invention is to provide an instrument for the purpose stated embodying a construction whereby it is specially adapted for use in the field to measure the elongation of rail joint bolts operatively installed in rail joints, and thereby determine or gauge the tension thereof.

With the foregoing and other objects in view, which will become more fully apparent as the nature of the invention is better understood, the same consists in the novel features of construction, combination and arrangement of parts as will be hereinafter more fully described, illustrated in the accompanying drawing and defined in the appended claims.

In the accompanying drawing, wherein like characters of reference denote corresponding parts in the different views:

Figure 1 is a side elevation of a measuring instrument constructed in accordance with one practical embodiment of the invention and shown as operatively applied to a rail joint bolt.

Figure 2 is a top plan view of the instrument.

Figure 3 is a fragmentary end view of the instrument; and

Figure 4 is a section on the line 4—4 of Fig. 1.

Referring to the drawing in detail, it will be observed that the present measuring instrument, generally speaking, is of substantially inverted U-shape as viewed in side elevation and is composed, principally, of two main parts; viz., a body member A of substantially inverted L-shape as viewed in side elevation comprising a substantially vertically disposed arm 10 and a substantially horizontally disposed arm 11, and a lever member B, also of substantially inverted L-shape as viewed in side elevation comprising a substantially vertically disposed arm 12 and a substantially horizontally disposed arm 13.

The substantially horizontally disposed arms 11 and 13 of the members A and B are disposed in side to side relationship with their substantially vertically disposed arms 10 and 12, respectively, depending and spaced apart. Thus, as aforesaid, the instrument, generally speaking, is of substantially inverted U-shape as viewed in side elevation.

The lever member B, at or near the junction of its arms 12 and 13, is pivotally connected by a pin 14 to the substantially horizontally disposed arm 11 of the member A at or near the end of said arm 11 remote from the end thereof from which depends the arm 10.

The pivot pin 14 extends transversely of the arms 11 and 13 and the member B pivots in its plane about said pivot pin relative to the member A. Accordingly, swinging movement of the member B in one direction results in the lower end portion of the arm 12 approaching the arm 10, and swinging movement of said member B in the other direction results in the arm 12 receding or moving away from the arm 10.

By any suitable yieldable means such, for example, as a yoke-like spring 15 engaged with the pivot pin 14 and with the arms 11 and 12 of the members A and B, respectively, the member B is constantly urged rotatively relative to the member A in a direction such that its arm 12 tends to approach the arm 10.

At or near its lower end the arm 10 has threaded therethrough a screw 16 which extends parallel, or substantially parallel, to the arm 11 and which, at its inner end, is suitably formed, or is provided with, suitable means to contact one end of a bolt the elongation of which is to be measured. In the present instance the screw 16 is illustrated as being provided at its inner end with a head 16' having a spherical recess in its inner face to accommodate a bolt head of spherical form.

The screw 16 is adjustable inwardly and outwardly relative to the arm 10 to adapt the instrument for measuring bolts of different lengths, and on said screw is a nut 17 for engagement with the arm 10 to lock said screw in any adjusted position in which it may be placed.

Despite the side to side relationship of the members A and B, the lower end portions of the arms 10 and 12 of said members are suitably alined with each other. This alinement may be effected in any suitable manner as, for example, by suitably bending either or both of the arms 10 and 12. In the present instance only the arm 12 is bent, as indicated at 18. In any event, the lower portion of the arm 12 is provided with a contact element 19 of any suitable form extending inwardly therefrom for contact with the end of a bolt to be measured opposite the end thereof that is engaged by the contact element 16' at the inner end of the screw 16. Moreover, the lower end portion of the arm 12 preferably is provided with an inwardly extending stop element 20 of any suitable form spaced from the contact element 19 for engagement with the periphery of a bolt to be measured to facilitate engagement of the contact element 19 with the end of the bolt centrally thereof or at least to insure the same positioning of the contact element 19 relative to the end of the bolt regardless of repeated applications and removals of the instrument to and from the bolt.

The contact element 19 may be in the form of a pin threaded into the arm 12 or otherwise suitably fastened thereto and having a rounded inner end to engage the end of the bolt.

Mounted on one of the arms 11 or 13 for cooperation with the other of said arms to indicate angular movements of the lever member B relative to the body member A, is a gauge 21 of any suitable type. In the present instance this gauge is of the single contact, dial type and is mounted on the arm 11, being disposed horizontally thereabove and having its operating contact pin 22 engaging and cooperating with the upper edge of the arm 13.

Preferably, the gauge 21 is mounted so that its contact pin 22 is spaced the same distance from the pivot pin 14 as the contact pin 19, whereby said pins 19 and 22 are movable equal amounts when the lever member B is swung relative to the body member A. By thus spacing the contact pins 19 and 22 a standard gauge 21 calibrated in fractions of an inch may advantageously be used for indicating angular movements of the lever member B relative to the body member A. However, the gauge 21 may be otherwise positioned and may be calibrated in any desired manner to indicate angular movements of the member B relative to the member A.

At 23 is designated a stop element carried by the arm 11 and engageable by the arm 13 to limit swinging movement of the member B relative to the member A under the influence of the spring 15, while at 24 is designated a finger-piece carried by the arm 13 for finger engagement to depress the arm 13 relative to the arm 11 to effect movement of the lower end portion of the arm 12 away from the lower end portion of the arm 10.

In the use of the instrument the screw 16 first is adjusted to obtain proper spacing of its contact element 16' from the contact pin 19 in accordance with the length of the bolt elongation of which is to be measured. The bolt to be measured may, for example, be a rail joint bolt 25 as illustrated in Fig. 1 of the drawing, and in that connection it will be noted that the instrument, because of its inverted U-shape, is specially adapted for measuring rail joint bolts in track, as the arms 11 and 13 may span the rail while the contact element 16 and the contact pin 19 are engaged with opposite ends of the bolt 25.

For a bolt of a given size the amount of elongation thereof corresponding to a given tension or holding force is known. Accordingly, tightening of the nut 26 of the bolt until the bolt has been elongated a certain amount will result in a certain tension being set up in the bolt and in the bolt exerting a certain holding force.

Two measurements of the bolt are taken, one while the bolt is not under load and the other while it is under load. Accordingly, prior to the first measurement, the nut 26, if it is tight, is loosened. By means of the finger-piece 24 or in any desired manner the lever member B then is swung relative to the member A to move the arm 12 away from the arm 10 sufficiently to permit the instrument to be placed with its contact element 16' and its contact pin 19 at opposite ends of the bolt as illustrated in Fig. 1. The lever member B then is released, whereupon the spring 15 acts to swing the arm 12 toward the arm 10 until the contact element 16' and the contact pin 19 actually engage the opposite ends of the bolt. The indication of the gauge 21 then is noted. The nut 26 then is tightened until the gauge 21 indicates an amount of elongation of the bolt corresponding to the desired tension or holding force it is desired to set up in the bolt. The instrument may remain engaged with the bolt during tightening of the nut or may be removed from the bolt during tightening of the nut and may readily be re-applied as often as necessary to ascertain when a desired tension has been set up in the bolt.

Bolts such as rail joint bolts of any given size are of equal normal lengths within exceedingly small fractions of an inch and elongate equal amounts within very small fractions of an inch under equal tensions. Consequently, in using the instrument to determine the necessary adjustments of the nuts of a number of bolts of a given size it is not essential to measure the length of each bolt when its nut is loosened.

Obviously, the instrument is effective to indicate when the elastic limit of a bolt has been exceeded, as in that case the indications of the gauge 21 will be the same, or substantially the same, when the nut of the bolt is and is not tightened.

Without further description it is thought that the features and advantages of the invention will be readily apparent to those skilled in the art, and it will, of course, be understood that changes in the form, proportion and minor details of construction may be resorted to, without departing from the spirit of the invention and scope of the appended claims.

I claim:

1. A measuring instrument comprising a body member of substantially inverted L-shape including a substantially horizontally disposed arm and a substantially vertically disposed arm, a lever member of substantially inverted L-shape including a substantially horizontally disposed arm and a substantially vertically disposed arm, a pivotal connection between the substantially horizontally disposed arm of said body member near the end thereof remote from its substantially vertically disposed arm and said lever member near the point of junction of the arms thereof, contact elements carried by the substantially vertically disposed arms of said members for engagement with the ends of an element elongation of which is to be measured, one of the contact elements being in the form of a pin extending inwardly from its related arm, a positioning element also extending inwardly from the arm carrying said pin and in transverse section being curved and disposed concentrically to said pin for engagement with a peripheral portion of an element to be measured, to determine the positioning of said pin contact element relative thereto, spring means tending constantly to swing said lever member about said pivot to urge its substantially vertically disposed arm toward the substantially vertically disposed arm of said body member, thereby to maintain contact of said contact elements with the ends of the element to be measured, and gauge means carried by the substantially horizontally disposed arm of one of said members and cooperating with the substantially horizontally disposed arm of the other of said members to indicate angular movements imparted to said lever member by elongation of an element to be measured disposed between said contact elements.

2. A measuring instrument comprising a body member of substantially inverted L-shape including a substantially horizontally disposed arm and a substantially vertically disposed arm, a lever member of substantially inverted L-shape including a substantially horizontally disposed arm and a substantially vertically disposed arm, a pivotal connection between the substantially horizontally disposed arm of said body member near the end thereof remote from its substantially vertically disposed arm and said lever member near the point of junction of the arms thereof, contact elements carried by the substantially vertically disposed arms of said members for engagement with the ends of the element to be measured, one of said contact elements being in the form of an inwardly extending pin and the other of which contact elements being adjustably mounted and disposed concentrically to said pin, a positioning element for the instrument also extending inwardly from the arm carrying the said pin and disposed in spaced relation to said pin, spring means tending constantly to swing said lever member about said pivot to urge its substantially vertically disposed arm toward the substantially vertically disposed arm of said body member, thereby to maintain contact of said contact elements with the ends of the element to be measured, and gauge means carried by the substantially horizontally disposed arm of one of said members and cooperating with the substantially horizontally disposed arm of the other of said members to indicate angular movements imparted to said lever member by elongation of an element to be measured disposed between said contact elements.

WILLIAM EYRE GADD.